United States Patent Office 3,459,797
Patented Aug. 5, 1969

3,459,797
PROCESS FOR THE PRODUCTION OF ACETIC ACID BY CATALYTIC GAS-PHASE OXIDATION OF BUTENES
Rudolf Brockhaus, Marl, and Erich Berger, Recklinghausen, Germany, assignors to Chemische Werke Huls A.G., Marl, Germany
No Drawing. Filed Mar. 3, 1966, Ser. No. 531,344
Claims priority, application Germany, Mar. 13, 1965, C 35,308
Int. Cl. C07c 51/20
U.S. Cl. 260—533       15 Claims

ABSTRACT OF THE DISCLOSURE

Acetic acid is produced by reacting a butene with oxygen at 200–300° C. in the presence of a tin vanadate catalyst, the reaction being preferably conducted in the presence of steam.

---

This invention relates in general to acetic acid, and more particularly to a method of producing same.

Various processes have been employed heretofore to produce acetic acid by the oxidation of unsaturated hydrocarbons, such as acetylene, ethylene, or saturated low-boiling hydrocarbons, such as butane or hexane. When unsaturated hydrocarbons having more than two carbon atoms are oxidized in the liquid phase and in the presence of noble metal catalysts, the product contains predominantly ketones, whereas oxidation in the absence of catalysts and at higher reaction temperatures results in a mixture of several reaction products, such as acids, glycols, and the esters thereof. Several of these products, however, tend to resinify under the prevailing reaction conditions; consequently, poor yields of usable products are obtained.

With the increase in refining of oil to meet the growing demands for gasoline, correspondingly greater amounts of valuable by-products, such as butene, are produced. It is, therefore, desirable to utilize butene as a raw material in the production of acetic acid. However, it is economically infeasible, with the catalysts employed heretofore, to control the oxidation of butene to form acetic acid in high yields.

It is, therefore, a principal object of this invention to provide an improved oxidation process for the production of acetic acid from butenes.

It is another object of the invention to provide an improved oxidation catalyst for this process.

These and other objects and advantages will become apparent by reference to the following description and claims appended hereto.

It was surprisingly discovered that acetic acid can be produced by the gas-phase oxidation of butenes with oxygen or oxygen-containing gases, if desired, in the presence of steam, when the reaction is conducted in the presence of a tin vanadate catalyst and at temperatures of 200–300° C.

In a preferred embodiment of this invention, the oxidation of butenes is carried out at temperatures of 230–260° C., more preferably at 240–250° C. The catalysts utilized in this process make possible the advantageous use of the relatively low gas-phase oxidation temperatures and thus materials of construction that can withstand high temperatures are unneeded. To increase the space-time yield, the reaction is conducted at elevated pressures ranging between 0.5 and 15 atmospheres, preferably between 1 and 6 atmospheres.

The catalysts employed herein have a molar ratio of tin to vanadium of 10:1 to 1:10, preferably 1:0.5 to 1:2, and, therefore include ortho-, pyro- and meta-vanadates, especially the ortho- and pyro-vanadates.

These catalysts can be produced, for example, by combining an aqueous solution of tin salts, such as $SnCl_2$ or $SnCl_4$ with an aqueous solution of aminovanadate, such as $H_3VO_4(HOC_2H_4NH_2)_3$ in a continuous manner, and in stoichiometric or almost stoichiometric amounts. Upon combining these solutions (except when operating in extreme dilutions), a precipitate is obtained which is then separated from the mother liquor, washed, dried, and calcined. Alternatively, the catalyst can be formed from a solution of vanadium pentoxide and tin salts in strong hydrochloric acid. In this case, formation and precipitation of the tin vanadate is achieved by neutralizing the chlorine ions with a volatile base, preferably ammonia, the resulting precipitate then being processed as described above. Other methods (described in Examples 1–6) exemplify the preparation of the catalyst.

The tin vanadate catalyst can be used in the form of free particles or deposited on a suitable carrier. In the latter case, the catalyst can be conveniently deposited by carrying out the precipitation in the presence of the carrier; but the catalyst can also be combined with the carrier after the precipitate has been washed. Suitable carriers for the catalyst are, for example, silicic acid, kieselguhr, alumina, or carborundum. The proportion of the carrier to the active catalyst can be varied within wide limits (5:1 to 1:10).

The catalyst, whether it is in particle form or deposited on a carrier, is desirably heat treated at temperatures of 350–700° C., particularly at temperatures of 500–520° C. before it is used. This heat treatment is practicable in presence of air.

The catalyst prepared in the above-described manner can be employed in the reactors suitable for the gas-phase reaction according to the present invention.

In the acetic acid synthesis according to the invention, it is desirable to employ an excess of oxygen, the molar ratio of butene to oxygen ranging between 1:1 to 1:20, preferably ranging between 1:2 to 1:5. In the event air is used as the source of oxygen, the molar ratio of butenes to air can range from 1:100 to 1:2, preferably 1:10 to 1:40. Also, air enriched with up to 40% oxygen can be advantageously used; the concentrations of the gaseous reactants are adjusted to correspond to the above values.

It is also desirable to carry out the oxidation of butenes in the presence of steam which serves to elevate the reaction temperature and controls, to some extent, the selectivity of the reaction. Moreover, it has been found that higher yields are obtained when steam is utilized in the reaction. If saturated steam is used, it desirably constitutes 5 to 50 mol percent of the reactants. In the event the reaction is conducted at elevated temperatures with superheated steam, good results are obtained too.

The oxidation reaction is desirably conducted in a reactor with a fluidized catalyst bed, but fixed catalyst-bed reactors can also be used. If desired, the reactor is surrounded by a heated oil or salt bath which is used to regulate the reactor temperature.

Although satisfactory yields of acetic acid are obtained with only one pass of the reactants through the catalyst bed, even higher yields can be realized when the reaction is conducted at pressures of 1 to 6 atmospheres and the unreacted gases are recycled to the reactor. Preferably, the molar ratio of recycled gas to feed stock (recycle ratio) is between 10 to 1, more preferably 3 to 1. For example, when a feed gas is charged containing butene, air, and steam in the proportions of 1:25:2.5, respectively, a recycle ratio of 3:1 results in higher yields.

In the oxidation of butenes, the hydrocarbon chain is cleaved and a terminal carbon is oxidized to form an acid. The oxidation of n-butene results in the highest yields of acetic acid; with some propionic acid being formed (maximally 15% of the total amount of acid). Oxidation of isobutene, as compared to the other butenes, results in less favorable yields of acetic acid. Further, in this connection, the position of the double bond in n-butene is not important. Surprisingly, both of the n-butenes give the same good results. Therefore it is possible to oxidize a cheap technical mixture containing more n-butene-2 than n-butene-1.

In these reactions, formic acid is initially formed, but due to its unstable nature under the reaction conditions, it decomposes to carbon monoxide. Thus, the reaction product contains little if any formic acid (about 1%, based on acetic acid), this being advantageous especially during the working-up of the reaction product since formic acid is highly corrosive. In addition to these by-products, minute quantities of about 1% (based on acetic acid) of carbonyl compounds mostly in the form of formaldehyde are also produced.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

In the production of the catalyst, 677 g. tin chloride ($SnCl_2 \cdot 2H_2O$) are dissolved in 1 liter of water, and 182 g. vanadium pentoxide are dissolved in 1 liter of water containing 410 g. ethanolamine. These solutions are then combined over a period of 2½ minutes at 60° C. and under vigorous stirring—precipitation occurring immediately. To the resulting solution there is added 1 liter of water while stirring for 1 hour at 60° C. Subsequently, the precipitate is removed by centrifugation, formed into an aqueous slurry and again centrifuged. The catalyst is washed in a suction filter, dried, and heated for 8 hours at 520° C., comminuted, and then separated by sieving into various particle sizes. The sieve fraction obtained having 0.1–0.3 mm. mesh is employed, the apparent density thereof being 1.5 g./ml. In this catalyst, the atomic proportion of tin:vanadium is 1:0.65.

EXAMPLE 2

391 g. tin tetrachloride and 182 g. vanadium pentoxide are dissolved in a mixture of 3 liters of concentrated (36%) hydrochloric acid and 1 liter of water. In an agitated vessel, a solution of 1 liter of water and 100 g. ammonium chloride are prepared at a temperature of 0° C. (the ammonium chloride serving to buffer and prevent premature hydrolysis of the tin chloride). The acidic solution is introduced into the agitated vessel over a period of 20 minutes and, at the same time, a sufficient amount of concentrated ammonia solution is added to adjust the pH of the resulting solution to 7. Upon neutralization of the hydrochloric acid, precipitation commences immediately.

The catalyst thus obtained has the following characteristics: apparent density, 1.95; atomic proportion of tin:vanadium, 1:1.3.

EXAMPLE 3

389 g. stannous chloride ($SnCl_2 \cdot 2H_2O$) and 91 g. vanadium pentoxide are dissolved in 1 liter of an acidic solution of (18%) hydrochloric acid. In an agitated vessel, a mixture of 430 g. of a 28% colloidal silicic acid solution and 1 liter of water is provided. The acidic solution is introduced into the agitated vessel over a period of 12 minutes while constantly neutralizing with concentrated ammonia solution, precipitation occurring during this procedure. Control of the pH at 7 during the mixing of these solutions is constantly monitored with a glass electrode. The temperature in the agitated vessel is maintained at 40° C. while stirring for one hour. Thereafter, the precipitate is removed by suction filtration, washed, dried, and heat-treated for 16 hours at 500° C. The resulting catalyst is then separated by sieving into various-sized particles.

The catalyst prepared in this manner has the following characteristics: apparent density, 1.60; atomic proportion of tin-vanadium, 1:0.694; support ($SiO_2$), 20% by weight.

EXAMPLE 4

677 g. stannous ($SnCl_2 \cdot 2H_2O$) and 182 g. vanadium pentoxide are dissolved in 3 liters of an acidic solution (18%) of hydrochloric acid. In an agitated vessel, 1 liter of water is provided at 60° C. The acidic solution is introduced over a period of 15 minutes into the agitated vessel while simultaneously adding a sufficient amount of ammonia solution to maintain the pH at 5, precipitation occurring immediately. The pH of the resulting solution is monitored with a glass electrode and the temperature in the mixing vessel is maintained at 60° C. The further working-up operation is conducted as in Example 1.

The atomic proportion of tin:vanadium in the finished catalyst is 1:0.75; the apparent density is 2.13.

EXAMPLE 5

The precipitation step is conducted as in Example 4. After washing the precipitate, and determining its dry weight, extremely fine dried silica gel, in an amount equal to the dry weight, is admixed therewith. The resulting catalyst is stirred to form a homogeneous mixture and then it is suction filtered, dried, for about 8 hours warmed at 520° C. in streaming air, crushed, and sieved. The part having a size between 0.1 and 0.3 mm. is used. It has an apparent density of 0.7 g./ml. The atomic proportion of tin:vanadium in this catalyst is 1:0.65, the portion of silica in it is 50% by weight.

EXAMPLE 6

The precipitation step is conducted as in Example 3 except that powdered aluminum hydroxide is incorporated as the carrier material in place of silicic acid. The homogeneous mixture is suction filtered, dried, warmed for 8 hours at about 520° C. in air, crushed, and sieved; the fraction with a size between 0.1 and 0.3 mm. is used. It has an apparent density of 0.8 g./ml. The atomic proportion of tin:vanadium is 1:0.67, the portion of aluminium hydroxide in it is 50.5% by weight.

EXAMPLE 7

150 ml. of the catalyst shown in Table I are employed in a conventional fluidized-bed reactor of quartz glass which is heated by a saline bath. Over a period of 4 hours, 600 Nl. air, 40 Nl. n-butene, and steam (see table) are passed through the reactor. The gases discharging from the reactor are cooled to condense water and acids which are then separated. The waste gas contains unreacted butene in addition to carbon oxides. The reaction conditions suitable for use with the individual catalysts and the corresponding butene conversion, and yields of reaction product are shown in Table I:

TABLE I.—CONVERSIONS AND YIELDS IN THE BUTENE OXIDATION

| Test No. | Catalyst of example | Amount of steam in 4 hours (Nl.) | Internal reactor temperature (° C.) | Conversion of butene in percent | Yields (percent) | | | | |
|---|---|---|---|---|---|---|---|---|---|
| | | | | | Acetic acid | Propionic acid | Formic acid | Formaldehyde | $CO+CO_2$ |
| 1 | I | 200 | 240 | 60 | 55 | 10 | 1 | 1 | 30 |
| 2 | II | 400 | 245 | 58 | 57 | 12 | 1 | 1 | 25 |
| 3 | III | 400 | 250 | 63 | 51 | 13 | 1 | 1.5 | 32 |
| 4 | IV | 200 | 240 | 70 | 65 | 4 | <1 | 1 | 28 |
| 5 | V | 200 | 260 | 60 | 60 | 6 | 0 | 1 | 30 |
| 6 | VI | 300 | 265 | 61 | 58 | 4 | 0 | 1 | 35 |

EXAMPLE 8

With the catalyst produced in Example 4, the oxidation reaction as in Example 7 is repeated with the following gaseous charges: 600 l. air, 6 l. butylene, and 100 l. steam. At a reduction temperature of 230° C., 95% of the butene charged was converted, 32% thereof to acetic acid.

EXAMPLE 9

The experiment of Example 7 with the catalyst prepared in Example 4 is repeated with the following gaseous charges: 600 l. air, 100 l. n-butene, and 300 l. steam. At a reaction temperature of 228° C., 31% butene was converted, 78% thereof to acetic acid.

EXAMPLE 10

Into a fluidized-bed reactor operated with cycle gas and containing 1.1 liter of catalyst of Example 4, 1500 Nl./hr. (normal liters being measured at 0° C. and 1 atmosphere absolute) of air, 150 Nl./hr. of steam, and 60 Nl./hr. of butene are charged at 4 atmospheres. A portion of the waste gas, 6000 Nl./hr., is recycled to the reactor; the remainder of the waste gas being discharged. The gas stream discharging from the reactor is cooled to condense the reaction product and water; these liquids then being separated. At an internal reactor temperature of 246° C., 85% of the charged butene is converted. The yield, based on the conversion, is as follows:

Acetic acid: 78%, propionic acid: 3%, and formic acid: <1%.

EXAMPLE 11

The oxidation reaction of Example 10 is repeated without the use of steam. The yield of acetic acid is 65%.

EXAMPLE 12

Into the apparatus of Example 10, 1000 Nl./hr. of nitrogen, 500 Nl./hr. of oxygen, 600 Nl./hr. of steam, and 150 Nl./hr. of butene-1 are introduced, at 4 atmospheres. Utilizing 7000 Nl./hr. of cycle gas and a reaction temperature of 242° C., 91% of butene is converted; there being obtained 76% acetic acid, in addition to traces of propionic acid and maleic acid.

EXAMPLE 13

Example 12 is repeated, using butene-2 instead of butene-1. 90% of butene is converted. Acetic acid is obtained in a yield of 77%.

Previously, vanadium oxide catalysts have been employed in the oxidation of butenes (Industrial and Engineering Chemistry, March 1952, p. 601). In all of these cases, carbon monoxide is the most important product, belonging to the produced acetic acid just the same yield of carbon dioxide and nearly the same yield of maleic acid and aldehydes.

Considering this fact, there was no stimulation to use other, special vanadates for this purpose. Surprisingly, just tin vanadates have been found to be the best catalysts.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the production of acetic acid by the catalytic gas-phase oxidation of butene, which process comprises: reacting at least one butene with molecular oxygen in intimate contact with a tin vanadate catalyst at 200–300° C., said vanadate being selected from the group consisting of ortho-vanadate, pyro-vanadate, meta-vanadate and mixtures thereof.

2. Process as defined by claim 1 wherein the molar ratio of tin to vanadium in said catalyst is 10:1 to 1:10.

3. Process as defined by claim 1 wherein the molar ratio of tin to vanadium in said catalyst is 1:0.5 to 1:2.

4. Process as defined by claim 1 wherein said catalyst is deposited on an inert carrier therefor.

5. Process as defined by claim 1 wherein the reaction is conducted at 230–260° C.

6. Process as defined by claim 1 wherein the reaction is conducted at 240–250° C.

7. Process as defined by claim 1 wherein the molar ratio of butenes to oxygen is 1:1 to 1:20.

8. Process as defined by claim 1, wherein the reaction is conducted in the presence of steam.

9. Process as defined by claim 1 wherein said butenes are reacted with air.

10. A process as defined by claim 1 wherein said at least one butene is a mixture of n-butene-1 and n-butene-2.

11. A process as defined by claim 1 wherein said at least one butene is an n-butene.

12. A process as defined by claim 1 wherein said vanadate is ortho-vanadate.

13. A process as defined by claim 1 wherein said vanadate is pyro-vanadate.

14. A process for the production of acetic acid by the catalytic gas-phase oxidation of butene, which process comprises: reacting at least one butene with molecular oxygen in intimate contact with a tin vanadate catalyst at 200–300° C., the reaction being conducted in the presence of steam.

15. Process as defined by claim 14 wherein the molar ratio of steam to butene is 1:1 to 1:20.

References Cited

UNITED STATES PATENTS 2,995,528  8/1961  Dowden et al. _____ 260—533
2,097,904  11/1937  Walters _____ 260—533

OTHER REFERENCES

Bretton et al., Ind. & Eng. Chem., vol. 44, March, 1952, pp. 594–603.

LORRAINE A. WEINBERGER, Primary Examiner

D. STENZEL, Assistant Examiner